US 008219255B2

(12) United States Patent
Jachmann et al.

(10) Patent No.: US 8,219,255 B2
(45) Date of Patent: Jul. 10, 2012

(54) METHOD AND SYSTEM FOR CONTROLLING AN ELECTRICAL INSTALLATION

(75) Inventors: Thomas Jachmann, Nürnberg (DE); Christian Kramer, Wilhermsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 363 days.

(21) Appl. No.: 12/445,591

(22) PCT Filed: Oct. 18, 2006

(86) PCT No.: PCT/DE2006/001870
§ 371 (c)(1),
(2), (4) Date: Apr. 15, 2009

(87) PCT Pub. No.: WO2008/046367
PCT Pub. Date: Apr. 24, 2008

(65) Prior Publication Data
US 2010/0312407 A1 Dec. 9, 2010

(51) Int. Cl.
*G05D 11/00* (2006.01)
(52) U.S. Cl. .......................... 700/286; 700/97
(58) Field of Classification Search .......... 700/97, 700/286
See application file for complete search history.

(56) References Cited

U.S. PATENT DOCUMENTS

| 6,215,263 | B1* | 4/2001 | Berkowitz et al. | 318/272 |
|---|---|---|---|---|
| 6,799,080 | B1* | 9/2004 | Hylden et al. | 700/97 |
| 7,293,112 | B2* | 11/2007 | Cone et al. | 709/250 |
| 7,415,368 | B2* | 8/2008 | Gilbert et al. | 702/61 |
| 7,672,262 | B2* | 3/2010 | McCoy et al. | 370/316 |
| 7,739,138 | B2* | 6/2010 | Chauhan et al. | 705/7.14 |
| 2002/0035495 | A1* | 3/2002 | Spira et al. | 705/7 |
| 2003/0172002 | A1* | 9/2003 | Spira et al. | 705/27 |
| 2003/0228005 | A1* | 12/2003 | Melick et al. | 379/93.01 |
| 2004/0002950 | A1* | 1/2004 | Brennan et al. | 707/1 |
| 2004/0090471 | A1* | 5/2004 | Cone et al. | 345/853 |
| 2004/0236620 | A1* | 11/2004 | Chauhan et al. | 705/9 |
| 2005/0033481 | A1* | 2/2005 | Budhraja et al. | 700/286 |
| 2005/0143941 | A1* | 6/2005 | Forth et al. | 702/61 |
| 2006/0240818 | A1* | 10/2006 | McCoy et al. | 455/430 |
| 2010/0262707 | A1* | 10/2010 | Johnson et al. | 709/230 |

OTHER PUBLICATIONS

Alarcon R. et al: "Distribution operation management system", Transmission and Distribution Conference and Exposition: Latin America 2004, IEEE/PES Sao Paulo, Brazil Nov. 8-11, 2004, Piscataway, NY, USA, IEEE, US Nov. 8, 2004 pp. 657-662, XP010799940. Schellstede G. et al.: "A Distributed Energy Management System Based on Open Architecture Rules", IEEE/NTUA Athens Power Tech-Conference "Planning Operation and Control of Todays Electric Power Systems", vol. 1 Sep. 5, 1993, pp. 114-119, XP010279021.

* cited by examiner

*Primary Examiner* — Albert Decady
*Assistant Examiner* — Anthony Whittington
(74) *Attorney, Agent, or Firm* — Laurence A. Greenberg; Werner H. Stemer; Ralph E. Locher

(57) ABSTRACT

A method and a system for controlling an electrical installation uses a graphics-based control system, e.g. a SCADA system and a geo-referenced information system, such as a geographic information system. The system is capable of displaying at least one component of the electrical installation and a piece of geo-referenced information that is linked to the component of the electrical installation. In the GIS, selectable context menus can be displayed in relation to specific geographic reference points, in particular in relation to the location coordinates of the components of the electrical installation, the menus being selected by a user. The context menus determine control commands for the SCADA system, the commands are transmitted directly to the SCADA system after a relevance check and are executed. A user can thus use the GIS system as a type of entry mask for the specification of control commands in the SCADA system.

14 Claims, 2 Drawing Sheets

METHOD AND SYSTEM FOR CONTROLLING AN ELECTRICAL INSTALLATION

BACKGROUND OF THE INVENTION

Field of the Invention

The invention relates to a method and a system for controlling an electrical installation using a graphics-based control system and a geo-referenced information system, in which at least one component of the electrical installation and an item of geo-referenced information that is linked to the component of the electrical installation can be displayed.

In supervisory control systems of electrical installations, particularly of electricity supply systems, a human operator has until now been provided with a control and display system divided into two and, in principle, decoupled and decoupled control and display systems do not interact with one another, or only in a very restricted manner.

To control certain parameters of an electrical installation, so called higher-level control and supervision systems such as, for example, SCADA (supervisory control and data access) systems are normally used which, in most cases with a conception of redundant architecture, guarantee almost one hundred percent monitoring and supervision reliability, secured twice in most cases. However, the graphical imaging of the electricity supply system to be controlled is very coarse and orientated especially with regard to the controllable components of the electricity supply system such as, for example, chokes or circuit breakers within an electrical high-voltage system. The distances between the controllable components of the electricity supply system frequently do not correspond to the actual distances and the connections are only displayed as single lines—in most cases only as right-angled lines—in contrast to the actual course of the route of the connecting cables.

In contrast, geo-information systems provide for a very detailed representation of the actual distances and proportions of the controllable components and of the connections, the displaying of the geo-based data alone consuming extensive computer resources so that previous geo-information systems are used exclusively for displaying geo-based data with a corresponding map which is in most cases a topological map.

Currently, in control rooms for controlling electricity supply systems, in particular electrical high-voltage systems, the SCADA system for directly controlling the electricity supply system and the GIS system for displaying of geographic data are operated largely autonomously and independently of one another. A change between the line representations of the electricity supply system as single-line representations in the SCADA system and the geographic representation in the GIS system is currently possible to a limited extent. However, the operator is not able to utilize typical SCADA functionalities such as the switching of system components within the GIS system. For the operator, this means a break in the work sequence since the operator must change to the SCADA system from the GIS system for the controlling function. The lack of coordination and different viewpoint in the GIS system and in the SCADA system prevents the operator from rapidly ascertaining the situation, particularly in critical situations such as a partial failure of the electricity supply system, and can thus lead to a faulty operation by the operator due to a false ascertainment of the representations. The continuous change between the representation of the real topological view in the GIS system, which can thus be ascertained in an intuitively simple manner, into the abstract component-oriented representation in the SCADA system, also makes it more difficult for the operator to continuously track the process sequences within the electricity supply system so that this operating mode of monitoring different forms of representation is very fatiguing and can thus lead to errors.

Thus, U.S. Pat. No. 6,496,189 B1 describes a method for representing data blocks of a three-dimensional environment. The data blocks are structured hierarchically in accordance with different resolutions. A display unit transmits selected coordinates of the region to be represented, which ensures a particular resolution in the region to be represented, particularly along a planned flight path.

WO 2005/024667 A1 discloses a method and a system for linking geo-related data to a corresponding geo-reference point in a geo-information system. According to this invention, the selective representation of locally relevant advertisement on a map, in particular, is carried out in such a manner that, after corresponding geo-related data have been input, these data are compared with regard to their relevance for the geo-reference point, which is also to be input, and if relevance exists, the geo-related data are displayed with reference to the geo-reference point. WO 2006/074054 A1 discloses a corresponding method for determining the relevance of the geo-referenced information and of the geo-reference point.

All methods and systems known in the prior art are used either exclusively for displaying geo-referenced information or exclusively for regulating and controlling electrical installations, particularly electricity supply systems.

BRIEF SUMMARY OF THE INVENTION

It is the object of the present invention, therefore, to provide a possibility of providing a human operator with an intuitive control of an electrical installation.

The object is achieved by a method according to claim 1. According to the invention, it is provided that the geo-referenced information can be selected in the geo-referenced information system and, in the case of a change of the geo-referenced information performed by an operator in the geo-referenced information system the change is checked with regard to its relevance for the graphics-based control system. Following this, if relevance exists, the operating procedure corresponding to the changed geo-referenced information is determined for the graphics-based control system and, following this, the corresponding operating procedure is implemented in the graphics-based control system. The previous parallelism of the geo-referenced information system, for example a geo-information system (GIS), and of the graphics-based control system, for example a SCADA system, is partially cancelled by the present invention. A selection or change in the geo-referenced information system is used for determining a corresponding operating procedure which can be activated in the graphics-based control system. This retains the high standard of reliability of the graphics-based control systems and, in practice, the human operator uses the geo-referenced information system as an input mask for his operating procedures. Checking the relevance of the changed geo-referenced information ensures that only data and information relevant to the graphics-based control system are processed as part of the present invention.

In an advantageous embodiment of the method, it is provided that, after the execution of the corresponding operating procedure in the graphics-based control system, the execution of the corresponding operating procedure is transmitted to the geo-referenced information system. This provides the operator with a direct feedback in the geo-referenced information system in the case of a change selected by him so that the operator can track the implementation exclusively in the geo-referenced information system. Thus, for example, when a previously opened circuit breaker is switched, the circuit breaker can be marked red in the geo-referenced information system and, after the corresponding geo-referenced information has been selected in the geo-referenced information system and has been implemented in the graphics-based control system, the circuit breaker can be marked with green as being in operation in the geo-referenced information system due to the feedback.

To provide good clarity and to ensure that the geo-referenced information is relevant, a context menu comprises the possible corresponding operating procedures for, for example, one component of the electrical installation. The context menu directly lists all possible operating procedures which can be selected by an operator. On the one hand, this reduces the checking of relevance and, on the other hand, the selected operating procedures can be delivered directly to the graphics-based control system. The geo-referenced information is also a symbol of at least one component of the electrical installation, where all possible operating procedures with respect to the component of the electrical installation can be selected by selecting the symbol. In this context, it is possible by clicking on a corresponding symbol, for example on a power transformer in an electrical high-voltage system, to select possible operating states on the basis of selecting the operating procedures or symbol, respectively.

It is considered to be an advantage that the corresponding operating procedure is a control instruction which can be implemented directly in the graphics-based control system. Since there is no need to transform the operating procedure selected in the geo-referenced information system into an operating procedure which can be read by the graphics-based control system, this prevents, in particular, the susceptibility to errors due to the transformation. At the same time, it ensures that the operator knows that the operating procedure selected in the geo-referenced information system is implemented as control instruction executed directly in the graphics-based control system.

The graphical feedback in the geo-referenced information system on the basis of the conditional changes of at least one component of the electrical installation due to the corresponding operating procedure conveys to the operator that the procedure has been implemented in the graphics-based control system. This can be indicated, for example, by a color change of a symbol selected in the geo-referenced information system from red for previously not in operation and subsequently green for in operation due to the last operating procedure.

The corresponding operating procedure is advantageously checked for plausibility with regard to the future changes of the current configuration of the component of the electrical installation or on the basis of the current configuration of the entire electrical installation and, in the case of a plausible operating procedure, the latter is forwarded to the graphics-based control system. This additional protection prevents that possibly unwanted operating procedures which are selectable in the geo-referenced information system certainly cannot be selected on the basis of the current configuration by the operator.

It is considered to be an advantage that rule-based systems, particularly expert systems and/or neural networks, determine the corresponding operating procedure on the basis of the selection in the geo-referenced information system and/or check the plausibility of the corresponding operating procedure on the basis of a configuration of at least one component of the electrical installation.

In particular, the geo-referenced information system is a geo-information system (GIS) and the graphics-based control system is a supervisory control and data access (SCADA) system.

The electrical installation is an electricity supply system, particularly an electrical high-voltage system. Electricity supply system in the sense of the present invention is any electricity supply system. The definition also comprises electricity supply systems for fluid media such as, for example, a gas pipeline system.

Other advantageous embodiments are found in the subclaims. The present invention will be explained in greater detail with reference to the exemplary embodiments in the figures, in which, by way of example,

DESCRIPTION OF THE INVENTION

Figure 1:
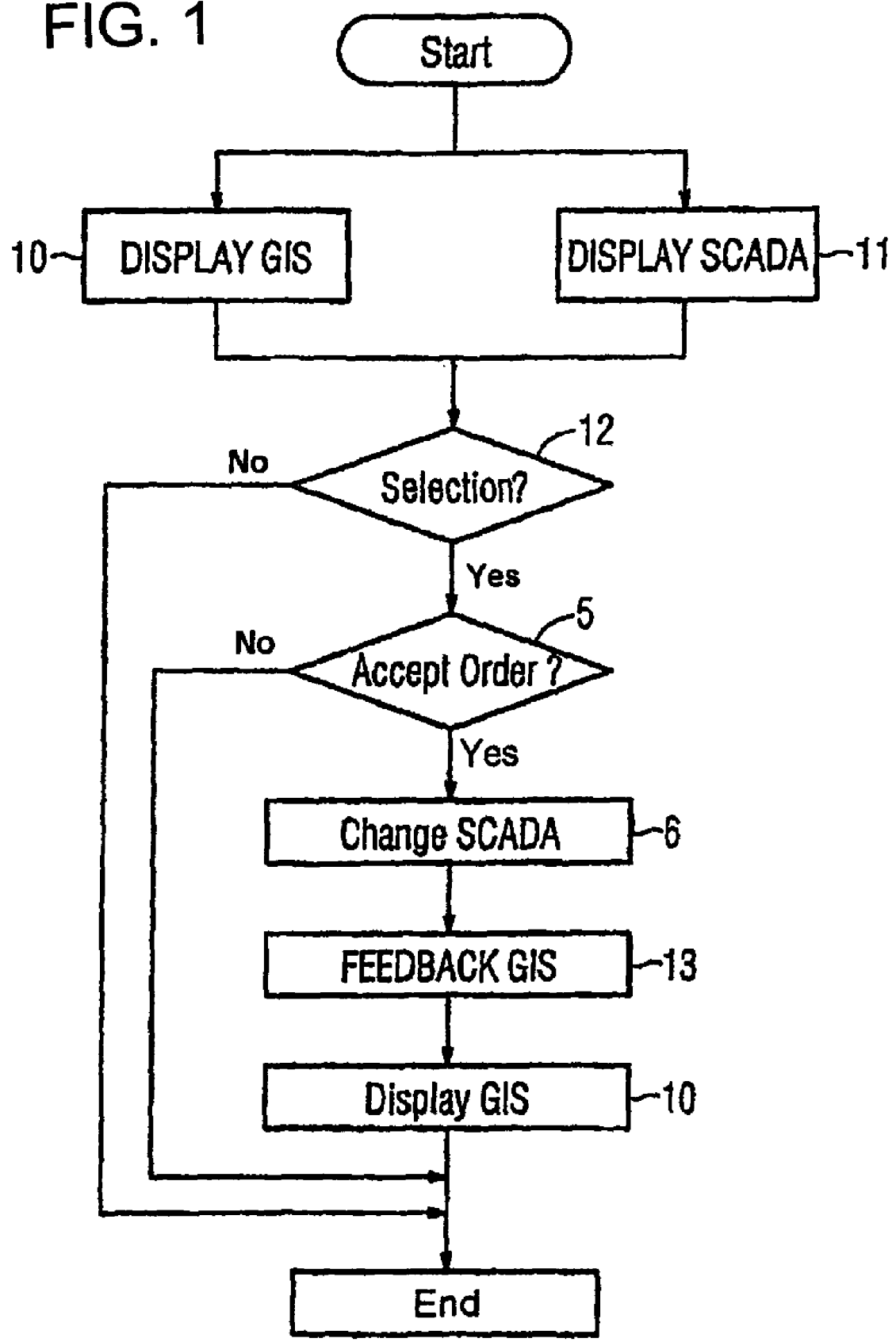
FIG. 1 shows a flow chart of the method according to the invention.

The figure FIG. 1 shows a flow chart of the method according to the invention. The geo-referenced information system 3, for example a GIS system (not shown) displays a representation 10 of the region currently to be monitored in the control room. The electricity supply system to be monitored, particularly an electrical high-voltage system, is also displayed to an operator as a corresponding SCADA representation 11 in the graphics-based control system 2 such as an SCADA system (not shown). An interrogation 12 checks whether a selection has been carried out in the GIS representation 10 on the basis of a context-related selection of the operator from possible operating procedures 6. If a corresponding selection is present, the relevance 5 of the selected operating procedure is checked according to the invention. In this connection, the plausibility of the selected operating procedure 6 can also be checked. If a plausible and relevant operating procedure 6 is present, the SCADA system 2 is correspondingly changed and the corresponding component of the electrical installation 1 is controlled. At the same time, there is feedback 13 from the SCADA system 2 to the GIS system 3 that the operating procedure has been executed, a corresponding change of the electrical installation 1 being displayed in a new GIS representation 10.

Figure 2:
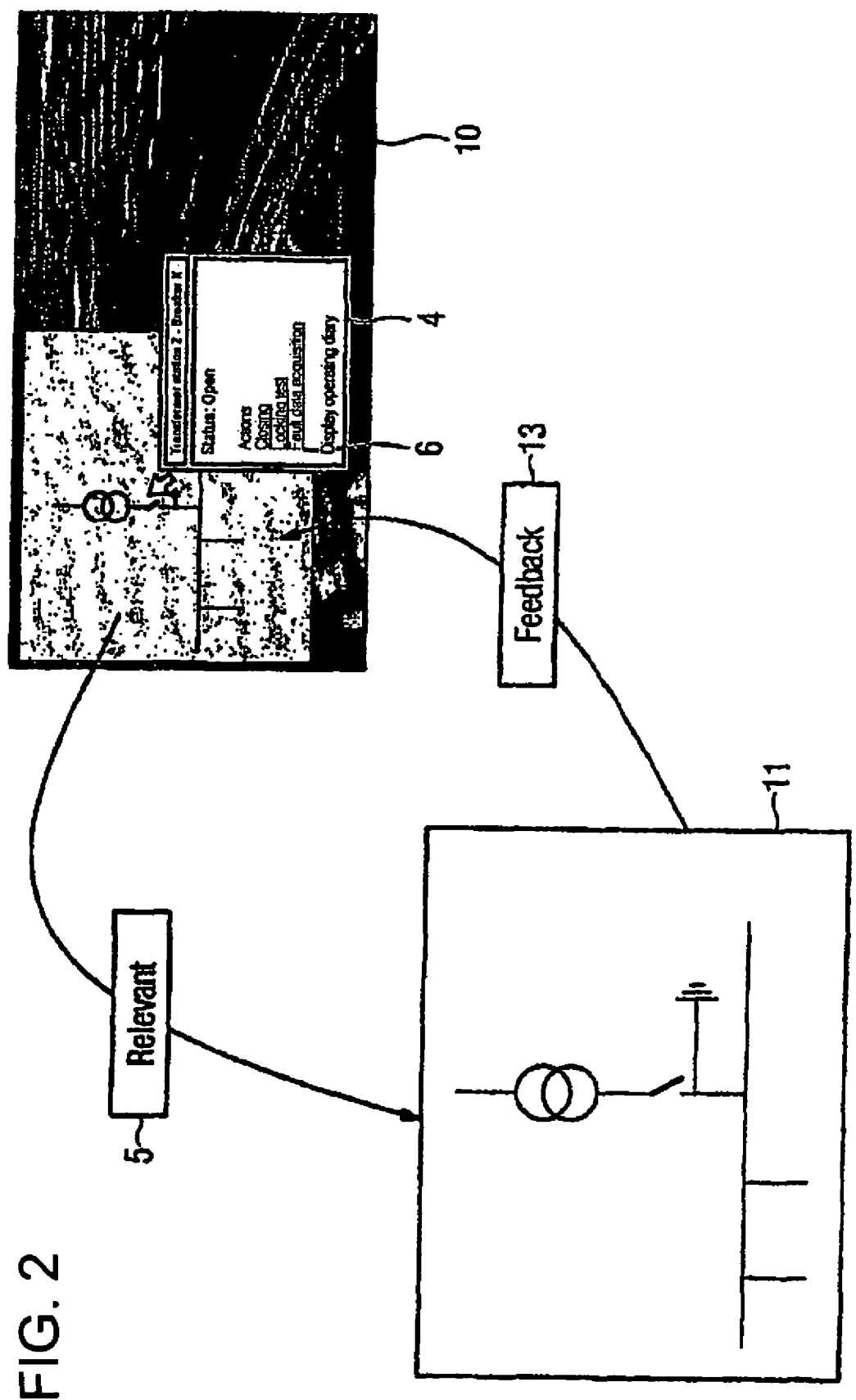
FIG. 2 shows a diagrammatic image of the method according to the invention.

The figure FIG. 2 shows a diagrammatic image of the method according to the invention. With the selection of an operating procedure 6 from a context menu 4 as geo-referenced information in the GIS representation 10, the relevance 5 of the selected operating procedure 6 is checked. If a relevant operating procedure 6 selected by the operator is present, it is implemented as control instruction in the SCADA system 2 (not shown) which is in the present case shown by the SCADA representation 11. The execution of the operating procedure 6 as control instruction in the SCADA system 2 is fed back to the GIS system 3 (not shown) via a feedback message 13.

According to the invention, a platform is created within the GIS system 3 in order to perform all conventional SCADA functionalities as operating procedures 6 directly on the component of the electrical installation 1 so that all SCADA functionalities can thus also be used in the GIS system 3. It is essentially a matter of geographically representing the current electrical installation 1 with its components and to interpret interactions of the operator in control instructions for the SCADA system 2. Thus, for example, when controlling an electrical high-voltage system as electrical installation 1, changes can be performed in alarm lists or protocols, in the operating diary as operating procedures 6. Operating procedures 6 can also be the acknowledgement of alarms, the triggering of switching processes, the triggering of a fault data acquisition, the individual and stepped control of operating means, the manual influencing of measurement values, the processing of switching sequences or similar actions of the operator.

The advantages of the integration between the SCADA system 2 and the GIS system 3, according to the invention, lie in the better work sequence for the operator. The type of representation of the electricity supply system 1 does not change anything in the functionalities and the control instructions in the SCADA system 2 in the form of selectable operating procedures in the GIS system 3. The functionality of the SCADA system 2, and thus the aspect of high reliability of this system, is maintained completely. In addition, it creates for the operator a consistent appearance of the representation 10 exclusively in the GIS system so that the operator does not have to monitor two systems 2, 3 or swap between the representations 10, 11.

The invention claimed is:

1. A method for controlling an electrical installation using a graphics-based control system and a geo-referenced information system, the method which comprises the steps of:
    providing a supervisory control and data access (SCADA) system as the graphics-based control system;
    providing a geo-information (GIS) system as the geo-referenced information system, wherein in the GIS system at least one component of the electrical installation and one item of geo-referenced information linked to the component of the electrical installation are displayed to an operator;
    checking whether a selection of the item of geo-referenced information in the GIS system has been carried out by the operator;
    checking whether a change of the item of geo-referenced information has been performed by the operator in the GIS system, wherein the checking includes checking the change with regard to its relevance for the SCADA system;
    subsequently, if relevance exists, determining an operating procedure corresponding to the changed item of geo-referenced information for the SCADA system; and
    subsequently, controlling the electrical installation by performing the corresponding operating procedure in the SCADA system.

2. The method according to claim 1, which further comprises that after the execution of the corresponding operating procedure in the SCADA system, transmitting an execution message to the GIS system in a form of a feedback message of the corresponding operating procedure.

3. The method according to claim 1, which further comprises providing the item of geo-referenced information as a context menu with possible corresponding operating procedures.

4. The method according to claim 1, which further comprises:
    forming the item of geo-referenced information as a symbol of at least one component of the electrical installation; and
    selecting operating procedures with respect to the component of the electrical installation by selecting the symbol.

5. The method according to claim 1, which further comprises forming the corresponding operating procedure as a control instruction which is implemented directly in the SCADA system.

6. The method according to claim 1, wherein changes, due to the corresponding operating procedure, in at least one component of the electrical installation are indicated in the GIS system.

7. The method according to claim 1, which further comprises checking future changes due to the corresponding operating procedure with regard to their plausibility on a basis of a current configuration of the component of the electrical installation and/or on a basis of the current configuration of the electrical installation and, in a case of a plausible operating procedure, the plausible operating procedure is forwarded to the SCADA system.

8. The method according to claim 1, which further comprises:
    providing rule-based systems for determining the corresponding operating procedure on a basis of a selection in the GIS system; and
    checking a plausibility of the corresponding operating procedure on a basis of a configuration of at least one component of the electrical installation.

9. The method according to claim 1, wherein the electrical installation is an electricity supply system.

10. The method according to claim 1, wherein the electrical installation is an electrical high-voltage system.

11. The method according to claim 8, which further comprises selecting the rule-based systems from the group consisting of expert systems and neural networks.

12. A system, comprising:
    means for performing a method for controlling an electrical installation using a supervisory control and data access (SCADA) system as a graphics-based control system and using a geo-information (GIS) system as a geo-referenced information system, wherein in the GIS system at least one component of the electrical installation and one item of geo-referenced information linked to the component of the electrical installation are displayed to an operator, said means programmed to:
        check whether a selection of the item of geo-referenced information in the GIS system has been carried out by the operator;
        check whether a change of the item of geo-referenced information has been performed by an operator in the GIS system, wherein the checking includes checking the change with regard to its relevance for the SCADA system;
        subsequently, if relevance exists, determine an operating procedure corresponding to the changed item of geo-referenced information for the SCADA system; and
        subsequently, controlling the electrical installation by performing the corresponding operating procedure in the graphics-based control system.

13. A non-transitory computer readable medium having computer-executable instructions for running in a computer for performing a method for controlling an electrical installation using a supervisory control and data access (SCADA) system as a graphics-based control system and using a geo-information (GIS) system as a geo-referenced information system, wherein in the GIS system at least one component of the electrical installation and one item of geo-referenced information linked to the component of the electrical installation are displayed to an operator, the method which comprises the steps of:

checking whether a selection of the item of geo-referenced information in the GIS system has been carried out by the operator;

a checking whether a change of the item of geo-referenced information has been performed by the operator in the GIS system, wherein the checking includes checking the change with regard to its relevance for the SCADA system;

subsequently, if relevance exists, determining an operating procedure corresponding to the changed item of geo-referenced information for the SCADA system; and subsequently, controlling the electrical installation by performing the corresponding operating procedure in the graphics-based control system.

14. A method for controlling an electrical installation using a graphics-based control system and a geo-referenced information system, the method which comprises the steps of:

in the geo-referenced information system, displaying at least one component of the electrical installation and one item of geo-referenced information, which is linked to the component of the electrical installation, to an operator;

checking whether a selection of the item of geo-referenced information in the geo-referenced information system has been carried out by the operator;

checking whether a change of the item of geo-referenced information has been performed by the operator in the geo-referenced information system, wherein the checking includes checking the change with regard to its relevance for the graphics-based control system;

subsequently, if relevance exists, determining an operating procedure corresponding to the changed item of geo-referenced information for the graphics-based control system;

subsequently, controlling the electrical installation by performing the corresponding operating procedure in the graphics-based control system;

providing rule-based systems for determining the corresponding operating procedure on a basis of a selection in the GIS system; and checking a plausibility of the corresponding operating procedure on a basis of a configuration of at least one component of the electrical installation.

* * * * *